United States Patent [19]

Merkel

[11] 4,369,426

[45] Jan. 18, 1983

[54] EMERGENCY DISTRESS SIGNAL SYSTEM FOR MOTOR VEHICLES

[75] Inventor: Wolfgang Merkel, Schwäbisch-Gmünd, Fed. Rep. of Germany

[73] Assignee: REPA Feinstanzwerk GmbH, Alfdorf, Fed. Rep. of Germany

[21] Appl. No.: 133,845

[22] Filed: Mar. 25, 1980

[30] Foreign Application Priority Data

Mar. 29, 1979 [DE] Fed. Rep. of Germany ....... 2912547

[51] Int. Cl.³ .......................... G08G 1/00; B60Q 9/00
[52] U.S. Cl. .................................. 340/32; 340/52 E; 340/52 H
[58] Field of Search ............... 340/32, 33, 31 R, 61, 340/52 E, 52 H, 539; 455/99; 180/268, 274, 282, 271; 343/112 PT; 307/10 SB

[56] References Cited

U.S. PATENT DOCUMENTS

| | | | |
|---|---|---|---|
| 3,441,858 | 4/1969 | Graham | 340/32 |
| 3,461,423 | 8/1969 | Trumble | 340/61 |
| 3,646,583 | 2/1972 | Scuderi | 340/52 H |
| 3,828,306 | 8/1974 | Angeloni | 343/112 PT |

FOREIGN PATENT DOCUMENTS

| | | | |
|---|---|---|---|
| 2552572 | 6/1977 | Fed. Rep. of Germany ... | 340/52 H |
| 52-1829 | 1/1977 | Japan | 340/52 H |

Primary Examiner—James J. Groody
Attorney, Agent, or Firm—Herbert L. Lerner; Laurence A. Greenberg

[57] ABSTRACT

An emergency distress signal system for motor vehicles includes a message transmitter for indicating the location of a vehicle and radiating an emergency distress signal, at least one reporting-receiving station for receiving the distress signal, and a sensor disposed in the vehicle for activating the message transmitting means upon the occurrence of a crash.

11 Claims, 3 Drawing Figures

EMERGENCY DISTRESS SIGNAL SYSTEM FOR MOTOR VEHICLES

The invention relates to an emergency distress signal system for motor vehicles, having message sending means for indicating the location of the vehicle, and with at least one reporting-receiving station.

The number of traffic accidents and accordingly the number of people killed or injured, particularly in road traffic, grows from year to year. Besides legal measures concerned with traffic safety, attempts are made to reduce the consequences of traffic accidents by continuously improving the safety provisions in the vehicles (for example safety belts). However, even these safety systems cannot prevent injuries of varying degree to the people in the vehicle, depending on the nature of the accident. To keep the consequences of such injuries within limits by prompt medical attention, so-called emergency call-posts have been installed at relatively short distances from each other along highways, such as for example on "Autobahnen". The call-posts are connected with a receiving station, such as the nearest police station, which reports the accident and its location and requests medical help. This type of emergency call system has various disadvantages. Firstly, the initial investment cost is very high, so that only long distance roads have been provided with such emergency call-posts or columns.

Secondly, this type of emergency call system must be physically operated by people, which means that the accident can only be reported by a person in the vehicle, or by a third person present at the place of the accident.

It is accordingly an object of the invention to provide an emergency distress signal system for motor vehicles which overcomes the heretofore-mentioned disadvantages of the heretofore-known devices of this general type, and to do this in such a manner that an exact report of the accident and the location of the addicent is automatically effected, i.e. without human help.

With the foregoing and other objects in view there is provided, in accordance with the invention, an emergency distress signal system for motor vehicles, comprising message transmitting means for indicating the location of a vehicle and radiating an emergency distress signal, at least one reporting-receiving station for receiving the distress signal, and a sensor disposed in the vehicle for actuating the message transmitting means upon the occurrance of a crash. The advantage of the system according to the invention is that an emergency call signal is sent immediately after an accident of a certain seriousness level, even if the people in the car are not then capable of any reaction, or if the accident occurs at a time at which no third person is present to report the accident to the rescue service by means of the conventional emergency call stations. Since the triggering of the emergency call is hereby effected automatically, it is not necessary to release the emergency call system by any action of the persons in the vehicle. Thus the permanent installation of emergency call-posts is made unnecessary. Instead, for example, the police stations, or other receiving or location finding stations distributed all over the country, can be provided with suitable receiving instruments, so that accidents occurring on minor roads can also be reported. Obviously, the emergency distress signal system according to the invention is not restricted to vehicles in road traffic. It can be equally advantageously used for air and water vehicles and vehicles on rails.

In accordance with another feature of the invention, the transmitting means comprises a radio having a transmitter and a transmitting antenna. The transmitter device is tuned to a predetermined emergency call-frequency. For example, a known CB radio transmitter can be used as the sending device.

In accordance with a further feature of the invention, the transmitting means includes means for withstanding a crash to allow transmission of the signal.

In accordance with an added feature of the invention, the antenna is fastened to an inherently stable part of the vehicle.

In accordance with an additional feature of the invention, the antenna is cemented to the vehicle. The transmitting device is preferably disposed in a location in the vehicle which, by experience, has been proven to be undisturbed even in serious accidents.

In accordance with yet another feature of the invention, the sensor includes means for sending different trigger pulses to the transmitting means and for producing differentiatable distress signals based on trigger-threshold values corresponding to graded crash loads.

In accordance with yet a further feature of the invention, the sensor is an electronic sensor.

In accordance with yet an added feature of the invention, the trigger-threshold values are assigned to given release or delay pulses of different duration which indicate the degree of crash load or impact.

In accordance with yet an additional feature of the invention, the sensor is a conventional electronic pulse generator or a known electrical or electronic trigger pulse device. Such trigger-pulse devices are used for back-tensioning devices for safetybelts and for electronic sensors for producing trigger pulses in air-bag installations. The above-mentioned different threshold values of the sensor make it possible to set priorities with respect to the reported seriousness of the accident when simultaneous emergency signals are received from several vehicles. Each threshold value can be used for a different emergency signal, so that the receiving station can estimate the urgency of the accident by the kind of incoming signal. The director of the rescue team can, in this way, first attend to the emergency call which indicates the most serious accident.

In accordance with still another feature of the invention, the sensor is a mechanical release mechanism controlled by the inertia of a movable mass.

In accordance with still a further feature of the invention, there is provided a safety system disposed in the vehicle for actuating the sensor, and means associated with the sensor for sending pulses to the transmitting means indicating whether or not the safety system is in use.

In accordance with still an added feature of the invention, the safety system is a safety belt system.

In accordance with still an additional feature of the invention, there are provided means disposed in the vehicle connected to the sensor for indicating actuation of the sensor and means for deactivating the sensor. Simultaneously, with the automatic release of the emergency signal system, this release is indicated to the people in the vehicle by accoustical or optical display means. If the person in the car should not be injured inspite of the accident, he has the option of interrupting the started emergency call himself, to avoid an unnecessary effort by the rescue service.

In accordance with a concomitant feature of the invention, the at least one reporting-receiving station is a plurality of topographically-distributed stations disposed at different locations for taking bearings on the transmitting device, and including a rescue center and message lines connected from the stations to the rescue center.

Other features which are considered as characteristic for the invention are set forth in the appended claims.

Although the invention is illustrated and described herein as embodied in an emergency distress signal system for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
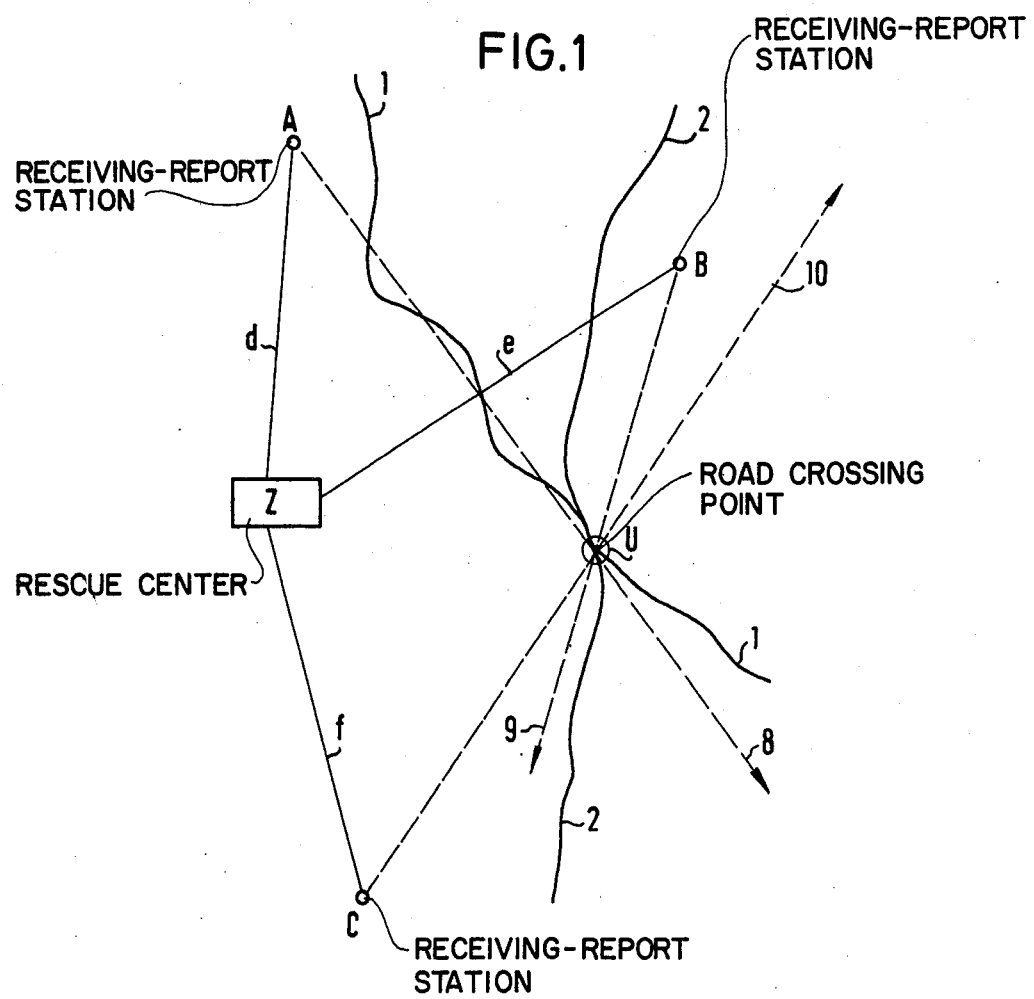
FIG. 1 is a diagrammatic topographic representation of the principal idea of the distress call-system showing a receiving station, rescue center and the place of the accident.

Referring now to the figures of the drawing and first particularly to the topographic map of FIG. 1 thereof, there is seen two crossing traffic routes designated with reference numerals 1 and 2. It is assumed that a traffic accident has occurred at the road crossing point U. Receiving-report stations and position-finding stations, are designated with reference letters A, B and C, and are equipped with radio-receiving devices. These receiving stations A, B, and C are connected by report lines d, e, and f, such as cable lines, with a rescue center Z.

Figure 2:
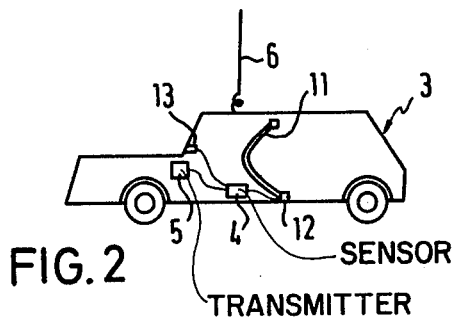
FIG. 2 is a diagrammatic side-elevational view of a vehicle equipped with a sensor and transmitting means according to the invention.

The vehicle 3 shown in FIG. 2 having the accident, is provided with a sensor 4 and a transmitter 5/6, which includes a sending portion such as a radio transmitter 5 and a transmitting antenna 6, for example. Sensor 4, transmitting means 5 and transmitting antenna 6 are constructed and attached to the vehicle 3 in such a way that they are not destroyed in case of a crash and that they are at least still capable of sending out a distress call. The sending device 5/6 can comprise a conventional CB-radio device, whereby the transmitting antenna 6 is either elastically yieldingly secured to the vehicle roof, for example by cementing, or to another specially stable part of the vehicle. The sensor 4 which is in functional, such as electrical, connection with the transmitting device, can be an electrical or electronic device, such as is used for airbag or back tension devices. This type of sensor gives an ignition impulse in the event of a crash, and thereby activates the transmitter 5/6 to cause it to send out a distress signal. The sensor 4 can also be a release mechanism which includes a releasing element comprising a movable mass which is moved from its rest position into the release position when large changes in the speed of the vehicle occur, i.e. in the case of a crash. In such a device a predetermined acceleration threshold value must be exceeded for triggering the release mechanism.

Figure 3:
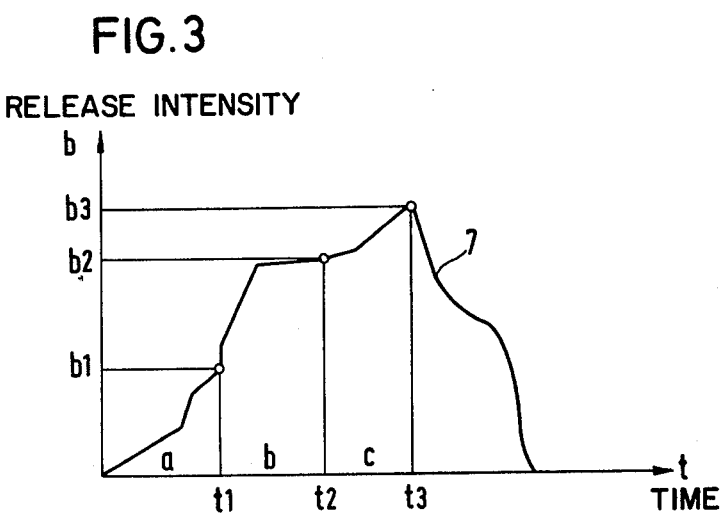
FIG. 3 is a graphical explanation of the function of the sensor using a diagram.

The sensor according to the invention is so constructed that it has three release-thresholds a,b, and c, as shown in FIG. 3. In the diagram according to the FIG. 3, the abscissa designates the release time t with the threshold-time parts a,b, and c, and with the threshold-release times t1, t2, t3. The ordinate shows the release-intensity b, which for example is the amount of impact-force in the case of a crash. The plot or curve of the trigger and the delay of the impulse is designated by reference numeral 7. In the case of a very low release impulse, i.e. at a minor accident, a release pulse is given to the transmitter means 5/6 through a time interval a, which causes the sending of a distress signal of a certain length, or other type of modulation, for example, which is identified by the receiver as definitely associated with this threshold value. At a greater release intensity, when exceeding the threshold value b1, which corresponds to a moderately serious accident and crash-load, the release impulse 7 is extended beyond the time interval b, and shortened, or some other kind of signal is caused, so that in the transmitter means 5/6 a distress signal is radiated out which exactly characterizes the seriousness of the accident. Correspondingly, when exceeding the threshold value b2 in the receiving station, a very serious accident is indicated by a differentiated distress signal.

The distress signal which is radiated from the transmitter 5/6 can be received by the receiving station A,B or C, which takes bearings on the sender, and can locate the place of the accident U, that corresponds to the intersection point of the position finding lines 8,9, and 10, shown in dotted lines in FIG. 1. The receiving stations A, B, and C report the location of the accident U to the rescue center Z, over the report lines d,e, and f, and the center Z initiates an immediate rescue operation. Based on the transmission of differentiated distress signals, the rescue center can decide on priorities, in the case of several distress calls, for example, by starting rescue operations at serious accident cites and giving priority over less serious accidents.

As indicated in FIG. 2, the sensor 4 can be in connection with a safety system in the vehicle, such as with the safetybelt system 11 for example, in such a manner that the rescue center receives information by a yes/no indicator, in case of a crash, as to whether the people in the vehicle used the safety system or not. In this manner, the rescue center obtains information beyond the mere reporting of the accident, based on which it can evaluate the consequences of the accident. This additional information can for example be obtained by activating a sensor-switch over a suitable switching element by means of a fastener element 12 of the safety belt 11, which causes the transmission of an additional signal.

Furthermore, according to FIG. 2, the sensor 4 can be in functional connection with a display and switching element 13, in such a manner that the triggering of the transmitter 5/6 is accoustically or optically indicated, so that the vehicle user is able to interrupt the automatically-started distress call, if he is not injured seriously enough to require rescue. In this manner unnecessary use of the rescue service is avoided.

There are claimed:

1. Emergency distress signal system for motor vehicles, comprising message transmitting means for indicating the location of a vehicle and radiating an emergency distress signal, at least one reporting-receiving station for receiving the distress signal, and a sensor disposed in the vehicle for actuating said message transmitting means upon the occurrence of a crash, said sensor including means for sending different trigger pulses to said transmitting means and for producing differentiatable distress signals based on trigger-threshold values corresponding to graded crash loads.

2. Emergency distress signal system according to claim 1, wherein said transmitting means comprises a radio having a transmitter and a transmitting antenna.

3. Emergency distress signal system according to claim 2, wherein said antenna is fastened to an inherently stable part of the vehicle.

4. Emergency distress signal system according to claim 3, wherein said antenna is cemented to the vehicle.

5. Emergency distress signal system according to claim 1 wherein said sensor is an electronic sensor.

6. Emergency distress signal system according to claim 1, wherein said trigger-threshold values are assigned to given release or delay pulses of different duration which indicate the degree of crash load.

7. Emergency distress signal system according to claim 1 or 6, wherein said sensor is a conventional electronic pulse generator.

8. Emergency distress signal system according to claim 1, including means disposed in the vehicle connected to said sensor for indicating activation of said sensor and means for deactivating said sensor.

9. Emergency distress signal system according to claim 1, wherein said at least one reporting-receiving station is a plurality of topographically-distributed stations disposed at different locations for taking bearings on said transmitting means, and the system including a rescue center and message lines connected from said stations to said rescue center.

10. Emergency distress signal system for motor vehicles, comprising message transmitting means for indicating the location of a vehicle and radiating an emergency distress signal, at least one reporting-receiving station for receiving the distress signal, a sensor disposed in the vehicle for actuating said message transmitting means upon the occurrence of a crash, a safety system disposed in the vehicle for actuating said sensor, and means associated with said sensor for sending pulses to said transmitting means indicating whether or not said safety system is in use.

11. Emergency distress signal system according to claim 8, wherein said safety system is a safety belt system.

* * * * *